United States Patent
Obermeier et al.

[11] Patent Number: 6,065,148
[45] Date of Patent: May 16, 2000

[54] METHOD FOR ERROR DETECTION AND CORRECTION IN A TRIP UNIT

[75] Inventors: Mark J. Obermeier, Coventry; Alan J. Messerli, Bristol; Paul H. Singer, West Hartford, all of Conn.

[73] Assignee: General Electric Company, Schenectady, N.Y.

[21] Appl. No.: 09/035,192

[22] Filed: Mar. 5, 1998

[51] Int. Cl.$^7$ .................................................. G11C 29/00
[52] U.S. Cl. ..................... 714/763; 714/721; 714/758; 714/764; 714/799
[58] Field of Search .................................. 714/763, 764, 714/766–771, 757, 758, 721, 799

[56] References Cited

U.S. PATENT DOCUMENTS

| | | | |
|---|---|---|---|
| 3,859,630 | 1/1975 | Bennett ................................... | 714/757 |
| 4,612,640 | 9/1986 | Mehrotra et al. ....................... | 714/766 |
| 4,633,471 | 12/1986 | Perera et al. ............................ | 714/758 |
| 4,918,695 | 4/1990 | Scheuneman et al. ................. | 714/805 |
| 5,293,295 | 3/1994 | Nishitani ................................ | 361/63 |

*Primary Examiner*—Emmanuel L. Moise
*Attorney, Agent, or Firm*—Cantor Colburn LLP; Carl B. Horton

[57] ABSTRACT

A method for error detection and correction in an electronic trip unit is presented. The electronic trip unit includes a ROM having trip unit application code, e.g., main functionality firmware, including initializing parameters, and boot code, stored therein and an EEPROM having operational parameter code, e.g., encoded enumerations for parameters such as 50/60 Hz., UL/ANSI/IEC, ect., stored therein The integrity of the code is monitored using CRC or checksum. Corrupted data is recovered by using encoded enumerations with at least two repetitive bit patterns of appropriate width. Encoding enumerations with greater that two repetitive bit patterns allows for each enumerated value to be recovered from any single bit corruption by replacing the corrupted pattern with the matching pattern. Alternatively, with a plurality of encoded enumeration groups stored in the EEPROM a corrupted enumeration can be properly selected and corrected by cross correlating the enumeration groups. Also, enumerations can be encoded with two identical bit patterns. An invalid bit pattern is then replaced with the other corresponding bit pattern, thereby restoring the bit pattern. The correct enumeration can then be identified, as one of the bit patterns continues to have the correct encoded enumeration identifying an enumeration.

11 Claims, 1 Drawing Sheet

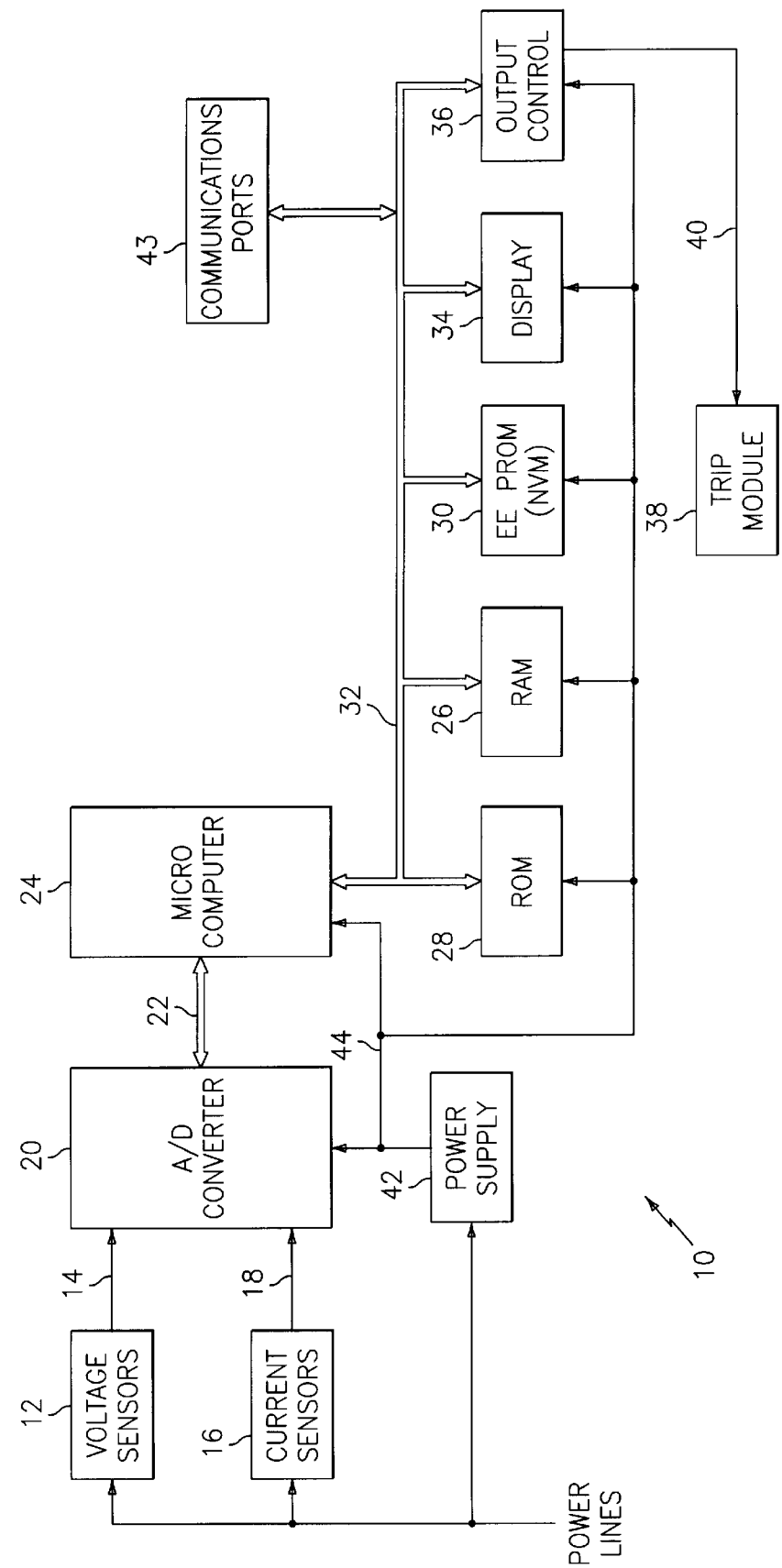

METHOD FOR ERROR DETECTION AND CORRECTION IN A TRIP UNIT

BACKGROUND OF THE INVENTION

The present invention relates generally to trip units. More specifically, the present invention relates a method of error detection and correction in an electronic trip unit.

Electronic trip units are well known. Electronic trip units typically comprise voltage and current sensors which provide analog signals indicative of the power line signals. The analog signals are converted by an A/D (analog/digital) converter to digital signals which are processed by a microcontroller. The trip unit further includes RAM (random access memory), ROM (read only memory) and EEPROM (electronic erasable programmable read only memory) all of which interface with the microcontroller. Data, typically status of the circuit breaker, is displayed by a display. An output control circuit controls a trip module. Calibration, testing, programming and other features are accomplished through a communications I/O port. A power supply which is powered by the service electricity, provides appropriate power to the components of the trip unit.

The ROM includes trip unit application code, e.g., main functionality firmware, including initializing parameters, and boot code. The EEPROM contains operational parameters for the application code, e.g., encoded enumerations for parameters such as 50/60 Hz., UL/ANSI/IEC, etc. Operational parameters stored in EEPROM are generally stored as fixed or floating point values and enumerations. An operational parameter such as a calibration factor or "pickup" setpoint is generally stored in fixed or floating point, e.g., 1.5. Eunmerators are used for discrete operators, such as 50 Hz. vs 60 Hz. applications or UL vs. ANSI bs IEC protection "standard" selection. The integrity of the code is typically monitored using CRC (cyclic redundancy check) or checksum, as are well known. Corrupted data in the EEPROM is corrected by reading fail-safe default data from the ROM and over writing the default data into the EEPROM. This often results in less than optimal trip unit performance. For example, a trip unit intended for 60 Hz. operation may be defaulted to 50 Hz. Accordingly, a need exists for a method to accurately restore corrupted enumeration data in electronic trip units.

SUMMARY OF THE INVENTION

The above-discussed and other drawbacks and deficiencies of the prior art are overcome or alleviated by the method for error detection and correction in a trip unit of the present invention. A trip unit comprises voltage and current sensors which provide analog signals indicative the power line signals. The analog signals are converted by an A/D (analog/digital) converter to digital signals which are processes by a microcomputer. The trip unit further includes RAM (random access memory), ROM (read only memory) and EEPROM (electronic erasable programmable read only memory) all of which communicate with the microcomputer. Data, typically status of the circuit breaker, is displayed by a display. An output control circuit controls a trip module. Calibration, testing, programming and other features are accomplished through a communications I/O port. A power supply which is powered by the service electricity, provides appropriate power to the components of the trip unit.

The ROM includes trip unit application code, e.g., main functionality firmware, including initializing parameters, and boot code. The EEPROM includes operational parameter code, e.g., encoded enumerations for parameters such as 50/60 Hz., UL/ANSI/IEC, ect. The integrity of the code is monitored using CRC (cyclic redundancy check) or checksum, as are well known. In accordance with the present invention, corrupted data is recovered using pattern matching or validation as described herein.

Pattern matching or validation in accordance with the present invention is accomplished by encoding the enumerations with at least two repetitive bit patterns of appropriate width, whereby the original pattern is recoverable directly from the corrupted value depending upon the number of enumerations necessary to define the set of values and the codes chosen to define the enumerations. Encoding enumerations with greater than two repetitive bit patterns allows for each enumerated value to be recovered from any single bit corruption by replacing the corrupted pattern with the matching pattern.

In accordance with an alternate embodiment, with a plurality of encoded enumeration groups stored in the EEPROM a corrupted enumeration can be properly selected and corrected by cross correlating the enumeration groups.

In accordance with another embodiment of the present invention enumerations are encoded with two identical bit patterns. The result again being that a single bit corruption in an encoded enumeration allows for correct identification and correction. In this embodiment an invalid bit pattern is replaced with the other corresponding bit pattern, thereby restoring the bit pattern. Also, the correct enumeration can be identified as one of the bit patterns continues to have the correct encoded enumeration identifying an enumeration.

The above-discussed and other features and advantages of the present invention will be appreciated and understood by those skilled in the art from the following detailed description and drawings.

BRIEF DESCRIPTION OF THE DRAWINGS

The FIGURE is a schematic block diagram of an electronic trip unit.

DESCRIPTION OF THE PREFERRED EMBODIMENT

Referring to the FIGURE, a general schematic of a trip unit is generally shown at 10. Trip unit 10 comprises a voltage sensor 12 which provides analog signals indicative of voltage measurements on a signal line 14 and a current sensor 16 which provides analog signals indicative of a current measurements on a signal line 18. The analog signals on line 14 and 18 are presented to an A/D (analog/digital) converter 20, which converts these analog signals to digital signals. The digital signals are presented over a bus 22 to a microcontroller (microcomputer) 24. Trip unit 10 further includes RAM (random access memory) 26, ROM (read only memory) 28 and EEPROM (electronic erasable programmable read only memory) 30 all of which communicate with the microcontroller 24 over a control bus 32. EEPROM 30 is non-volatile so that system information and programming will not be lost during a power interruption or outage. Data, typically status of the circuit breaker, is displayed by a display 34 in response to display signals received from microcontroller 24 over control bus 32. An output control 36, in response to control signals received from microcontroller 24 over control bus 32, controls a trip module 38 via a line 40. Calibration, testing, programming and other features are accomplished through a communications I/O port 43, which communicates with microcontroller 24 over control bus 32. A power supply 42 which is powered by the service electricity, provides appropriate power over a line 44 to the components of trip unit 10.

ROM 28 includes trip unit application code, e.g., main functionality firmware, including initializing parameters, and boot code. EEPROM 30 includes operational parameter code, e.g., encoded enumerations for parameters such as 50/60 Hz., UL/ANSI/IEC, ect. It will be appreciated that some or all of these parameters or options are stored in the trip unit at the factory and are selected to meet customers' requirements. During initialization of the electronics of the trip unit, blocks of data read from EEPROM 30 are validated with checksums. Checksum algorithms require minimal processing time. Once initialization functions are complete and application software is in effect, background functionality applies both checksum and cyclic redundancy check (CRC) algorithms to validate data integrity. In both cases, i.e., initial data validation and perpetual data validation, trip unit autonomous capability is applied through the methods of pattern matching or validation of the present invention. In accordance with the present invention, corrupted data is recovered using pattern matching or validation as described herein.

Pattern matching or validation in accordance with the present invention is accomplished in a preferred embodiment by encoding the enumerations with at least two repetitive bit patterns of appropriate width, the original pattern may be recovered directly from the corrupted value depending upon the number of enumerations necessary to define the set of values and the codes chosen to define the enumerations. It will be appreciated that the number of usable codes available is limited by the width of the encoded enumerated variable and the number of patterns replicated within the enumeration. Typically, the width of the encoded enumerated variable is governed by the addressing scheme of the embedded hardware. The maximum number of patterns replicated within the enumeration is dependent upon the number of enumerations required to define the variables' set of values and the width of the enumerated variable.

Encoding enumerations with greater than two repetitive bit patterns allows for each enumerated value to be recovered from any single bit corruption by replacing the corrupted pattern with the matching pattern. Referring to TABLE 1 below, by way of example, an 8 bit-wide enumerated variable is encoded into four enumerations using four, 2 bit-wide bit patterns.

TABLE 1

| Enumeration to be encoded | Hexadecimal bit pattern encoded | Binary bit pattern encoded | | | |
|---|---|---|---|---|---|
| | | MSB | | | LSB |
| enumeration #1 | 00 | 00 | 00 | 00 | 00 |
| enumeration #2 | 55 | 01 | 01 | 01 | 01 |
| enumeration #3 | AA | 10 | 10 | 10 | 10 |
| enumeration #4 | FF | 11 | 11 | 11 | 11 |

Referring to TABLE 2 below, a single bit corruption in any one of the enumerations, e.g., the underlined bit in enumeration #4, leaves three matching bit pairs (or nibbles), which are used to identify and replace the corrupted bit-pair resulting in an accurate correction of the enumerated value.

TABLE 2

| Enumeration to be encoded | Hexadecimal bit pattern encoded | Binary bit pattern encoded | | | |
|---|---|---|---|---|---|
| | | MSB | | | LSB |
| enumeration #1 | 00 | 00 | 00 | 00 | 00 |
| enumeration #2 | 55 | 01 | 01 | 01 | 01 |
| enumeration #3 | AA | 10 | 10 | 10 | 10 |
| enumeration #4 | EF | 11 | 1_0_ | 11 | 11 |

More specifically, if three out of the four bit-patterns are valid the correct enumeration can be selected, since none of the other enumerations has the same three encoded bit patterns. Also, the corrupted bit can be corrected as the program looking for an enumeration knows the correct bit patterns for the enumerations. Since the correct enumeration can be identified as described above the correct bit pattern is now known, as it corresponds to the selected enumeration. In other words, the program reading the enumeration would read a 11 10 11 11 (binary) which does not correspond to a known enumeration. The program would then check bit pairs and find that three of the four bit pairs corresponds to enumeration #4, whereby the program would correctly select enumeration #4. The program knowing that the correct bit pattern for enumeration #4 is 11 11 11 11 (binary) would cause the corrupted bit pattern to be changed from a 10 to a 11 (by replacing the corrupted bit pattern with one of the other bit patterns), thereby correcting the enumeration code.

In accordance with another example of the present invention enumerations are encoded with two repetitive (identical) bit patterns. Again, an invalid bit pattern is replaced with the other corresponding bit pattern, thereby restoring the corrupted bit pattern. Also, the correct enumeration can be identified as one of the bit patterns continues to have the correct encoded enumeration identifying an enumeration. Referring to TABLE 3 below, by way of example, an 8 bit-wide enumerated variable is encoded into eight enumerations using two, 4 bit-wide patterns.

TABLE 3

| Enumeration to be encoded | Hexadecimal bit pattern encoded | Binary bit pattern encoded | |
|---|---|---|---|
| | | MSB | LSB |
| enumeration #1 | 00 | 0000 | 0000 |
| enumeration #2 | 33 | 0011 | 0011 |
| enumeration #3 | 55 | 0101 | 0101 |
| enumeration #4 | 66 | 0110 | 0110 |
| enumeration #5 | 99 | 1001 | 1001 |
| enumeration #6 | AA | 1010 | 1010 |
| enumeration #8 | FF | 1111 | 1111 |

Referring to TABLE 4 below, a single bit corruption in any one of the enumerations, e.g., the underlined bit in enumeration #1, leaves one, 4 bit-wide pattern uncorrupted, which is used to identify and replace the corrupted bit pattern resulting in an accurate correction of the enumerated value.

TABLE 4

| Enumeration to be encoded | Hexadecimal bit pattern encoded | Binary bit pattern encoded | |
|---|---|---|---|
| | | MSB | LSB |
| enumeration #1 | <u>1</u>0 | 000<u>1</u> | 0000 |
| enumeration #2 | 33 | 0011 | 0011 |
| enumeration #3 | 55 | 0101 | 0101 |
| enumeration #4 | 66 | 0110 | 0110 |
| enumeration #5 | 99 | 1001 | 1001 |
| enumeration #6 | AA | 1010 | 1010 |
| enumeration #7 | CC | 1100 | 1100 |
| enumeration #8 | FF | 1111 | 1111 |

More specifically, if one, 4 bit-wide pattern is valid the correct enumeration can be selected, since none of the other enumerations has the same 4 bit-wide pattern. Since the correct enumeration can be identified as described above the correct bit pattern is now known, as it corresponds to the selected enumeration. In other words, the program reading the enumeration would read a 0001 0000 (binary) which does not correspond to a known enumeration. The program would then check bit patterns and find that one of the two, 4 bit-wide patterns, i.e., 0000, corresponds to enumeration #1, whereby the program would correctly select enumeration #1. The program knowing that the other one of the two, 4 bit-wide patterns is corrupted would cause the corrupted bit pattern, i.e., 0001, to be replaced with the correct corresponding 4 bit-wide pattern, i.e., 0000, thereby correcting the code.

In accordance with an alternate embodiment, with a plurality of encoded enumeration groups stored in EEPROM 34 a corrupted enumeration can be properly selected and corrected by cross correlating the enumeration groups. For example, if the code for IEC is selected it may be the case that 50 Hz. must also be selected. Accordingly, if the code for IEC was correctly detected but the code for 50/60 Hz. was corrupted, the program would select the 50 Hz. enumeration and correct the code accordingly.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A method for correcting an error in memory of an electronic trip unit, comprising:

encoding data stored in the memory with at least two repetitive bit patterns, each of said bit patterns having a bit-width of at least two bits;

detecting an error in one of said bit patterns; and replacing said bit pattern in which said error was detected with another one of said bit patterns.

2. The method of claim 1 wherein said step of detecting comprises:

applying a checksum algorithm or a cyclic redundancy check algorithm to said data.

3. The method of claim 1 wherein said at least two repetitive bit patterns comprises four repetitive bit patterns with said bit-width of each of said bit patterns comprising two bits.

4. The method of claim 1 wherein said at least two repetitive bit patterns comprises two repetitive bit patterns with said bit-width of each of said bit patterns comprising four bits.

5. The method of claim 1 wherein said data comprises an enumerated variable and said step of detecting comprises:

reading said data to determine if said data corresponds to a valid enumerated variable.

6. The method of claim 1 wherein said data comprises an enumerated variable, the method further comprising:

determining said enumerated variable from said another one of said bit patterns.

7. A method for selecting a correct variable from corrupted data in memory of an electronic trip unit, comprising:

encoding data stored in the memory with at least two repetitive bit patterns, each of said bit patterns having a bit-width of at least two bits, said encoded data comprising an enumerated variable;

detecting an error in one of said bit patterns; and determining said correct variable from another one of said bit patterns.

8. The method of claim 7 wherein said at least two repetitive bit patterns comprises four repetitive bit patterns with said bit-width of each of said bit patterns comprising two bits.

9. The method of claim 7 wherein said at least two repetitive bit patterns comprises two repetitive bit patterns with said bit-width of each of said bit patterns comprising four bits.

10. A method for selecting a correct variable from corrupted data in memory of an electronic trip unit, comprising:

reading first data comprising a first enumerated variable;

reading second data comprising a second enumerated variable; providing a list of acceptable second enumerated variables corresponding to said first enumerated variable; and comparing said second enumerated variable with said list of acceptable second enumerated variables to determine if said second data is corrupted.

11. The method of claim 10 further comprising:

correcting said second data based on said first enumerated value.

* * * * *

UNITED STATES PATENT AND TRADEMARK OFFICE
CERTIFICATE OF CORRECTION

PATENT NO. : 6,065,148 Page 1 of 1
DATED : May 16, 2000
INVENTOR(S) : Mark J. Obermeier et al.

It is certified that error appears in the above-identified patent and that said Letters Patent is hereby corrected as shown below:

<u>Title page,</u>
Item [57], ABSTRACT,
Line 7, after "UL/ANSI/IEC," delete "ect." and insert therefor -- etc. --
Line 7, after "therein", insert -- . -- (period)
Line 11, after "greater", delete "that" and insert therefor -- than --

<u>Column 1,</u>
Line 6, after "relates", insert -- to --
Line 32, after "1.5", delete "Eunmerators" and insert therefor -- Enumerators --
Line 51, after "indicative", insert -- of --

<u>Column 2,</u>
Line 1, after "UL/ANSI/IEC," delete "ect." and insert therefor-- etc. --
Line 46, after "current", delete "measurements" and insert therefor -- measurement --

<u>Column 3,</u>
Line 5, after "UL/ANSI/IEC," delete "ect." and insert therefor -- etc. --

<u>Column 4,</u>
Table 3, after the line "enumeration #6 AA 1010 1010", insert
-- enumeration #7 CC 1100 1100 --

Signed and Sealed this

Twenty-first Day of January, 2003

JAMES E. ROGAN
*Director of the United States Patent and Trademark Office*